US012407106B2

(12) United States Patent
Sjöberg et al.

(10) Patent No.: US 12,407,106 B2
(45) Date of Patent: Sep. 2, 2025

(54) ADAPTABLE MICROWAVE RADIO TRANSCEIVER SYSTEM

(71) Applicant: Telefonaktiebolaget LM Ericsson (publ), Stockholm (SE)

(72) Inventors: Daniel Sjöberg, Mölndal (SE); Göran Snygg, Partille (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 471 days.

(21) Appl. No.: 17/923,959

(22) PCT Filed: May 11, 2020

(86) PCT No.: PCT/SE2020/050480
§ 371 (c)(1),
(2) Date: Nov. 8, 2022

(87) PCT Pub. No.: WO2021/230778
PCT Pub. Date: Nov. 18, 2021

(65) Prior Publication Data
US 2023/0198153 A1 Jun. 22, 2023

(51) Int. Cl.
*H01Q 9/04* (2006.01)
*H01Q 19/13* (2006.01)

(52) U.S. Cl.
CPC ........... *H01Q 9/0442* (2013.01); *H01Q 19/13* (2013.01)

(58) Field of Classification Search
CPC ...... H01P 5/103; H01Q 1/1207; H01Q 19/13; H01Q 9/0442
See application file for complete search history.

(56) References Cited

U.S. PATENT DOCUMENTS 10,749,256 B1 * 8/2020 Sipp .......................... H01Q 1/48
2007/0222668 A1 9/2007 Schultheiss et al.

FOREIGN PATENT DOCUMENTS

CN 101604782 A 12/2009
CN 102509832 A 6/2012
(Continued)

OTHER PUBLICATIONS

European Search Report dated Jan. 18, 2024 for Application No. 20935872.0, consisting of 5 pages.
(Continued)

*Primary Examiner* — Timothy X Pham
(74) *Attorney, Agent, or Firm* — Weisberg I.P. Law, P.A.

(57) ABSTRACT

An adaptable microwave radio transceiver system having a microwave radio transceiver and at least two waveguide adapters, where the microwave radio transceiver is adapted for at least two waveguide frequency bands and includes at least one radio port that includes a corresponding probe of a fixed length and extends via an inner insulating part in a bottom in the corresponding radio port. Each waveguide adapter has a first end facing the corresponding bottom where each first end includes a bottom wall with an outer insulating part through which the corresponding probe is adapted to protrude a protrusion distance. The protrusion distance is dependent on a thickness of the bottom wall, where at least two waveguide adapters have different thickness of the corresponding bottom wall, where any one of the waveguide adapters is exchangeably mountable to the radio port.

20 Claims, 9 Drawing Sheets

(56) References Cited

FOREIGN PATENT DOCUMENTS

| | | | | |
|---|---|---|---|---|
| EP | 2451009 | A1 | | 5/2012 |
| JP | 2007013259 | A | | 1/2007 |
| JP | 2014182191 | | * | 3/2014 |
| JP | 2017028623 | A | | 2/2017 |

OTHER PUBLICATIONS

International Search Report and Written Opinion dated Jan. 26, 2021 for International Application No. PCT/SE2020/050480 filed May 11, 2020; consisting of 11 pages.
Cano, J.L., et al.; Octave bandwidth in-line rectangular waveguide-to-coaxial transition using oversized mode conversion. Electronics Letters, vol. 53 No. 20, pp. 1370-1371; Sep. 28, 2017; consisting of 2 pages.
Churkin, Sergey, et al.; SIW-Based Planar Orthomode Transducer for 28 GHz Applications; Proceedings of the 49th European Microwave Conference; pp. 682-685; Oct. 1-3, 2019; Paris, France; consisting of 4 pages.
Huang, Shih-Jou, et al.; W-Band BPSK and QPSK Transceivers With Costas-Loop Carrier Recovery in 65-nm CMOS Technology; IEEE Journal of Solid-State Circuits, vol. 46, No. 12, Oct. 6, 2011; consisting of 14 pages.

* cited by examiner

SECTION A-A

SECTION B-B

SECTION B-B

ADAPTABLE MICROWAVE RADIO TRANSCEIVER SYSTEM

CROSS-REFERENCE TO RELATED APPLICATION

This application is a Submission Under 35 U.S.C. § 371 for U.S. National Stage Patent Application of International Application Number: PCT/SE2020/050480, filed May 11, 2020 entitled "AN ADAPTABLE MICROWAVE RADIO TRANSCEIVER SYSTEM," the entirety of which is incorporated herein by reference.

TECHNICAL FIELD

The present disclosure relates to an adaptable microwave radio transceiver system comprising a microwave radio transceiver that is adapted for at least two waveguide frequency bands and comprises at least one radio port.

BACKGROUND

In many fields of wireless communication, such as microwave communication, as well as for applications associated with radars and other sensors using microwave technology, waveguides are used for transporting wireless signals, due to the low losses incurred in a waveguide.

A waveguide transition is usually needed when a waveguide interface, for example an antenna feeder, is mounted to a radio unit, where the transition is integrated in the microwave radio transceiver and comprises a shorted waveguide part with a probe. Previously, the bandwidth of waveguides and waveguide transitions has not limited the bandwidth of the microwave radio transceiver since the bandwidth of microwave radio components have been limited relative the bandwidth of the waveguide.

Today, microwave radio components have an increased wideband performance, and therefore the bandwidth of the waveguide will limit the useable bandwidth, and not as before the microwave radio components. Due to the limits of the waveguide, there will be a higher complexity in production regarding different frequency bands, different test stations, different mechanics etc.

Even if the microwave radio transceiver is capable of handling all frequency bands used, the waveguide transition will only be able to handle specific frequency bands, and therefore different microwave radio transceiver with different waveguide transitions that are adapted for the current waveguide band have to be made.

There is thus a need for an adaptable microwave radio transceiver system with corresponding components that can handle the different frequency bands comprised in the frequency band that the radio unit handles.

SUMMARY

It is an object of the present disclosure to provide an adaptable microwave radio transceiver system with corresponding components, where the system that can handle the frequency band of the radio unit. It is also an object of the present disclosure to provide a corresponding microwave radio transceiver and microwave waveguide adapter.

Said object is obtained by means of an adaptable microwave radio transceiver system comprising a microwave radio transceiver and at least two waveguide adapters, where the microwave radio transceiver is adapted for at least two waveguide frequency bands and comprises at least one radio port. Each radio port comprises a corresponding probe of a fixed length that is connected to a radio part, and extends via an inner insulating part in a bottom comprised in the corresponding radio port. Each waveguide adapter comprises a first end that is adapted to face the corresponding bottom, where each first end comprises a bottom wall with an outer insulating part, through which outer insulating part the corresponding probe is adapted to protrude a protrusion distance when mounted. The protrusion distance is dependent on a thickness of the bottom wall, where at least two waveguide adapters have different thickness of the corresponding bottom wall. Any one of the waveguide adapters is exchangeably mountable to said radio port.

In this way, the same type of radio transceiver can be adapted to handle different frequency bands, where different separately available waveguide adapters are sued to adapt the radio transceiver to a desired frequency band.

According to some aspects, each radio port comprises a corresponding radio cavity that in turn comprises the probe and has said bottom and a top. For each radio cavity, the probe extends within the radio cavity via the inner insulating part in the bottom towards the top. Each radio cavity is adapted to receive a corresponding waveguide adapter that comprises an adapter cavity that is adapted to be inserted into the radio cavity. The corresponding probe is adapted to protrude a protrusion distance within the corresponding adapter cavity when mounted.

In this way, a secure and reliable mounting is provided.

According to some aspects, at least one radio cavity and at least one corresponding adapter cavity has a square shape.

In this way, orthogonal polarizations can be handled.

According to some aspects, each waveguide adapter comprises a first adapter port and a second adapter port, where the first adapter port comprises a first adapter cavity and the second adapter port comprises a second adapter cavity, where the adapter cavities are connected via a diplexer arrangement comprised in the waveguide adapter.

In this way, a diplexer arrangement can comprise suitable adapter ports such that it can be mounted to any radio transceiver comprising corresponding radio ports.

According to some aspects, each waveguide adapter comprises a second end that comprises a waveguide interface and is adapted to face a waveguide part.

According to some aspects, the waveguide interface is adapted to be mounted to a waveguide part that comprises an antenna feeder that is comprised in an antenna arrangement.

This object is also obtained by means of a microwave radio transceiver, a microwave waveguide adapter and methods that are associated with the above advantages.

BRIEF DESCRIPTION OF THE DRAWINGS

The present disclosure will now be described more in detail with reference to the appended drawings, where.

DETAILED DESCRIPTION

Figure 1:
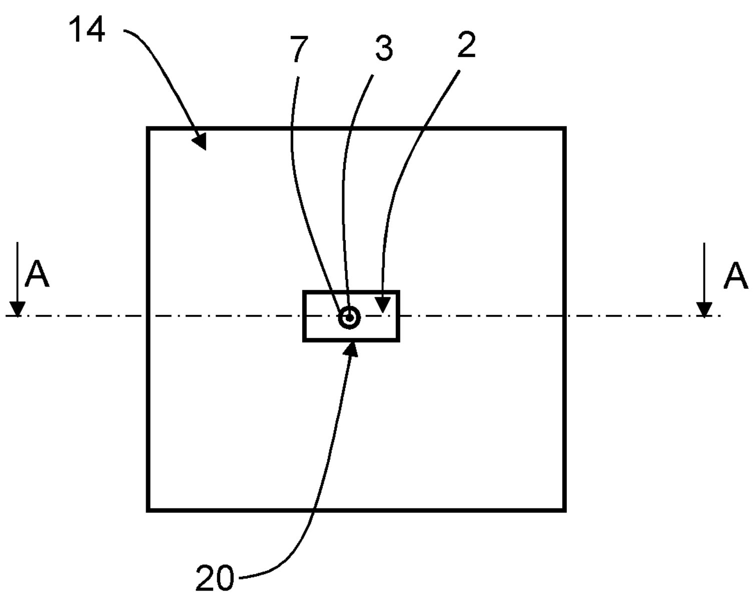
FIG. 1 shows a schematic front view of a radio unit according to first example.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 2:
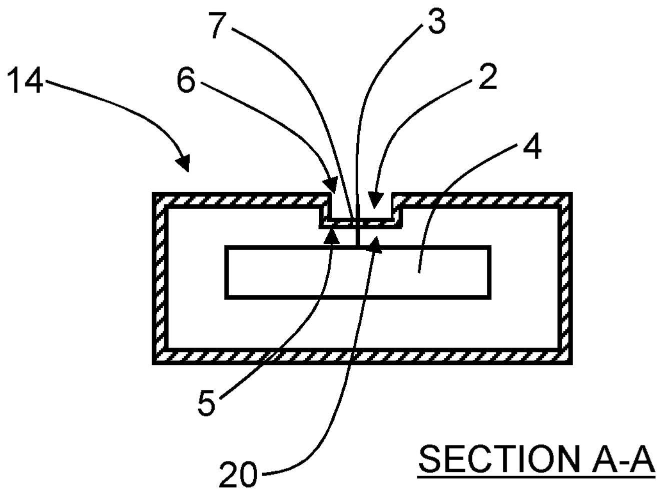
FIG. 2 shows a schematic section side view of the radio unit according to the first example.

With reference to FIG. 1 and FIG. 2, showing a first example, there is microwave radio transceiver 14 comprising one radio port 20. that in turn comprises a corresponding radio cavity 2 with a probe 3 of a fixed length that is connected to a radio part 4. The radio cavity has a bottom 5 and a top 6, where the probe 3 extends within the radio cavity 2 via an inner insulating part 7 in the bottom 5 towards the top 6. According to some aspects, the inner insulating part 7 is formed in a plastic material such as for example polytetrafluoroethylene (PTFE).

With reference also to FIG. 3-7, the radio cavity 2 is adapted to receive a corresponding waveguide adapter $\mathbf{8}_1$, $\mathbf{8}_2$. Here, two different waveguide adapters $\mathbf{8}_1$, $\mathbf{8}_2$ are shown, and the adaptable microwave radio transceiver system 1 can comprise any number of different waveguide adapters $\mathbf{8}_1$, $\mathbf{8}_2$ that together can provide coverage for all frequency bands the radio part 4 is capable of handling. Therefore, one standard microwave radio transceiver 14 can be made for all frequency bands the radio part 4 is capable of handling, having an identical radio cavity 2. Adaption for the waveguide part 14 that is to be used is acquired by mounting the correct waveguide adapters $\mathbf{8}_1$, $\mathbf{8}_2$.

Figure 3:
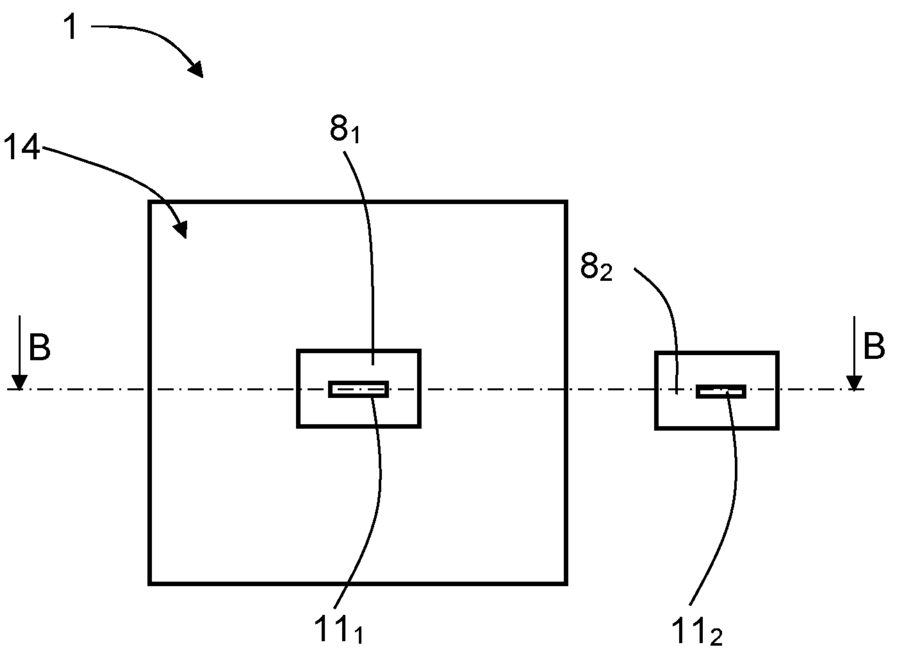
FIG. 3 corresponds to FIG. 1 with a waveguide adapter mounted or to be mounted.
Figure 4:
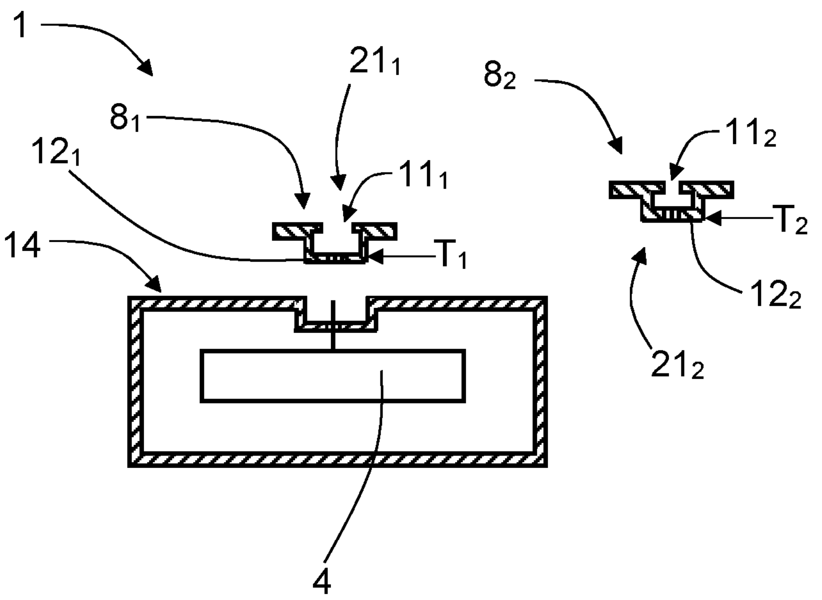
FIG. 4 corresponds to FIG. 2 with a waveguide adapter to be mounted.
Figure 5:
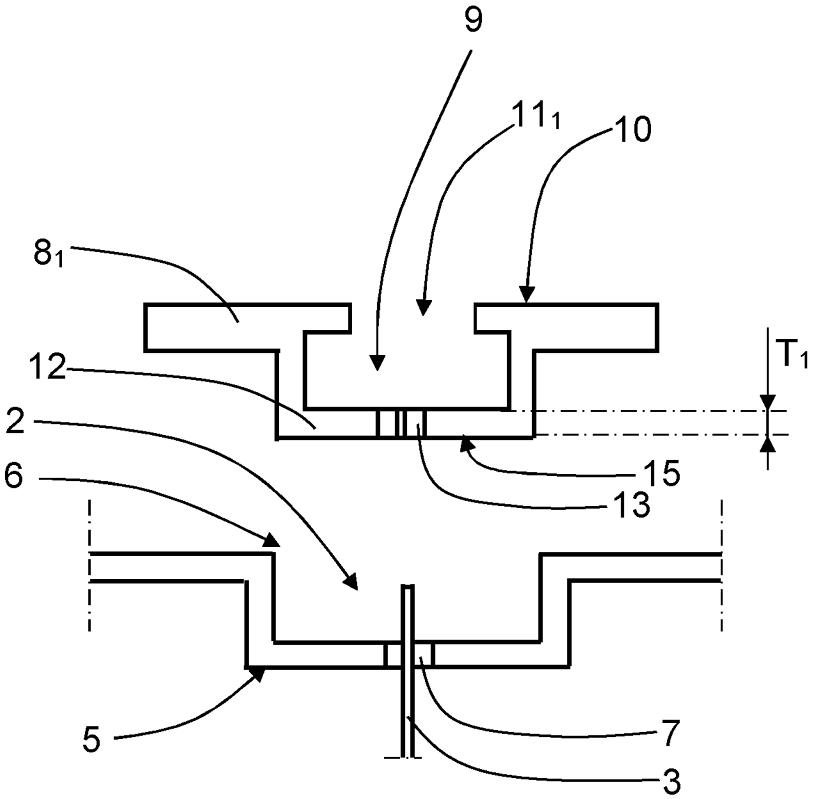
FIG. 5 shows an enlarged cut-open view of a part of FIG. 4.
Figure 6:
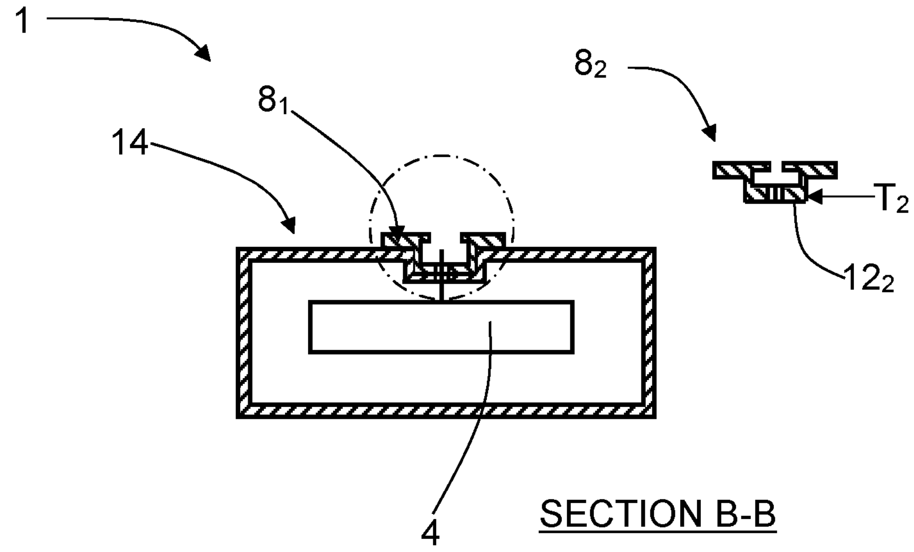
FIG. 6 corresponds to FIG. 2 with a waveguide adapter mounted.
Figure 7:
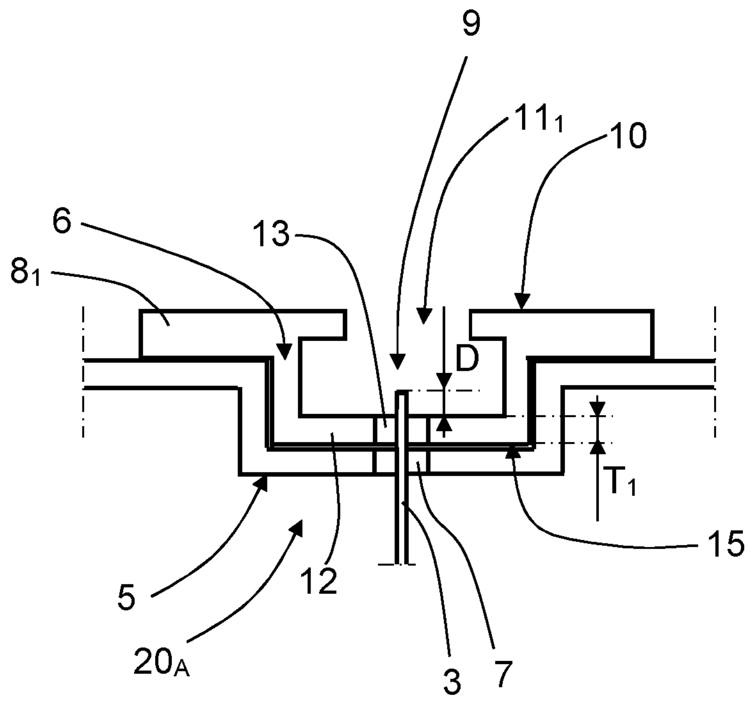
FIG. 7 shows an enlarged cut-open view of a part of FIG. 6.

According to the first example, each waveguide adapter $\mathbf{8}_1$, $\mathbf{8}_2$ comprises an adapter port $\mathbf{21}_1$, $\mathbf{21}_2$ with an adapter cavity 9 that is adapted to be inserted into the radio cavity 2. FIG. 3 shows a top view of a microwave radio transceiver 14 and two waveguide adapters $\mathbf{8}_1$, $\mathbf{8}_2$. FIG. 4 shows a first section view of FIG. 3 where a first waveguide adapter $\mathbf{8}_1$ is about to be mounted to the radio cavity 2, and a second waveguide adapter $\mathbf{8}_2$ is standing by, not being used at the moment. FIG. 6 shows a second section view of FIG. 3 where the first waveguide adapter $\mathbf{8}_1$ has been mounted to the radio cavity 2. FIG. 5 shows an enlarged cut-open side view of the first waveguide adapter $\mathbf{8}_1$ that is about to be mounted to the radio cavity 2, and FIG. 7 shows an enlarged cut-open side view of the first waveguide adapter $\mathbf{8}_1$ when it has been mounted to the radio cavity 2.

Each waveguide adapter $\mathbf{8}_1$, $\mathbf{8}_2$ comprises a first end 15 and a second end 10 that is opposite the first end 15, where the first end 15 is adapted to face the bottom 5 and comprises a bottom wall $\mathbf{12}_1$, $\mathbf{12}_2$ with an outer insulating part 13. The probe 3 is adapted to protrude through the outer insulating part 13 and extend a protrusion distance D within the adapter cavity 9 when mounted. It is to be noted that the protrusion distance D is dependent on a thickness $T_1$, $T_2$ of the bottom wall $\mathbf{12}_1$, $\mathbf{12}_2$.

Figure 8:
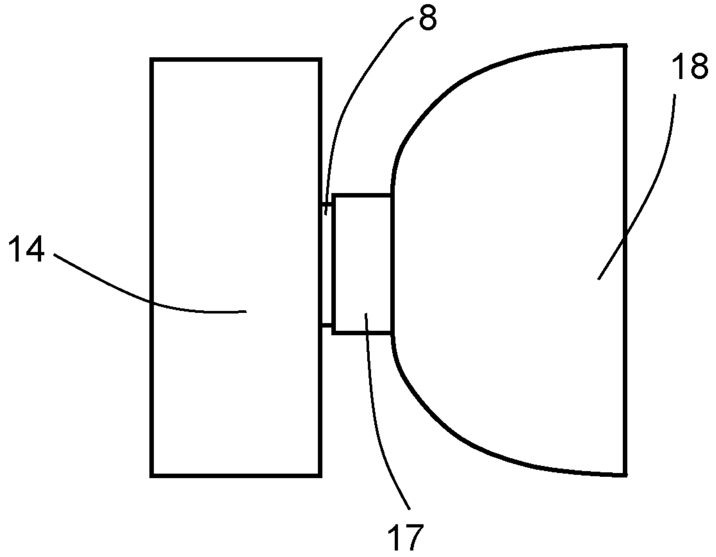
FIG. 8 shows a schematic side view of a radio unit with an antenna.

The second end 10 comprises a waveguide interface $\mathbf{11}_1$, $\mathbf{11}_2$ and is adapted to face a waveguide part 17, for example in the form of an antenna feeder 17 that is comprised in an antenna arrangement 18 as shown in FIG. 8. In this way, by choosing a waveguide adapter $\mathbf{8}_1$, $\mathbf{8}_2$ with an adapted protrusion distance D, it is possible to acquire a tuning to a desired frequency band for the waveguide interface $\mathbf{11}_1$, $\mathbf{11}_2$ and the waveguide part 17. This is illustrated in FIG. 3, FIG. 4 and FIG. 6 where there is an adaptable microwave radio transceiver system 1 comprising the microwave radio transceiver 14 and two waveguide adapters $\mathbf{8}_1$, $\mathbf{8}_2$. The protrusion distance D for the respective waveguide adapter $\mathbf{8}_1$, $\mathbf{8}_2$ is dependent on the thickness $T_1$, $T_2$ of the respective bottom wall $\mathbf{12}_1$, $\mathbf{12}_2$. Since the waveguide adapters $\mathbf{8}_1$, $\mathbf{8}_2$ have different thickness $T_1$, $T_2$ of the corresponding bottom wall $\mathbf{12}_1$, $\mathbf{12}_2$, they provide different protrusion distance D and therefore offer tuning to different frequency bands for the waveguide interface $\mathbf{11}_1$, $\mathbf{11}_2$ and the waveguide part 17. Any one of the waveguide adapters $\mathbf{8}_1$, $\mathbf{8}_2$ is exchangeably mountable to the radio port. With reference to FIG. 4, the thicknesses $T_1$, $T_2$ of the bottom walls $\mathbf{12}_1$, $\mathbf{12}_2$ and the size of the waveguide interfaces $\mathbf{11}_1$, $\mathbf{11}_2$ indicate that the first waveguide adapter $\mathbf{8}_1$ is adapted for a lower frequency band than the second waveguide adapter $\mathbf{8}_2$, the thickness $T_1$ being smaller and the waveguide interface $\mathbf{11}_2$ being larger for the first waveguide adapter $\mathbf{8}_1$.

Figure 9:
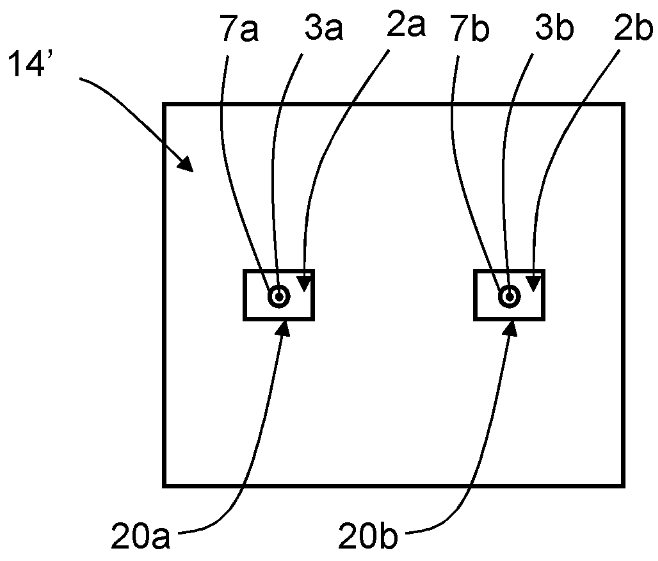
FIG. 9 shows a schematic front view of a radio unit according to second example.

Depending on function and requirement, a microwave radio transceiver 14 can comprise more than the one radio cavity 2 shown. According to some aspects, with reference to FIG. 9, showing a second example, the microwave radio transceiver 14' comprises a transmitting radio port **20*a* adapted to transmit a generated signal, and a receiving radio port 20*b* adapted to receive a received signal. The transmitting radio port 20*a* comprises a first radio cavity 2*a*, a first inner insulating part 7*a*, and a first probe 3*a*. The receiving radio port 20*b* comprises a second radio cavity 2*ba*, a second inner insulating part 7*b*, and a second probe 3*b***.

Figure 10:
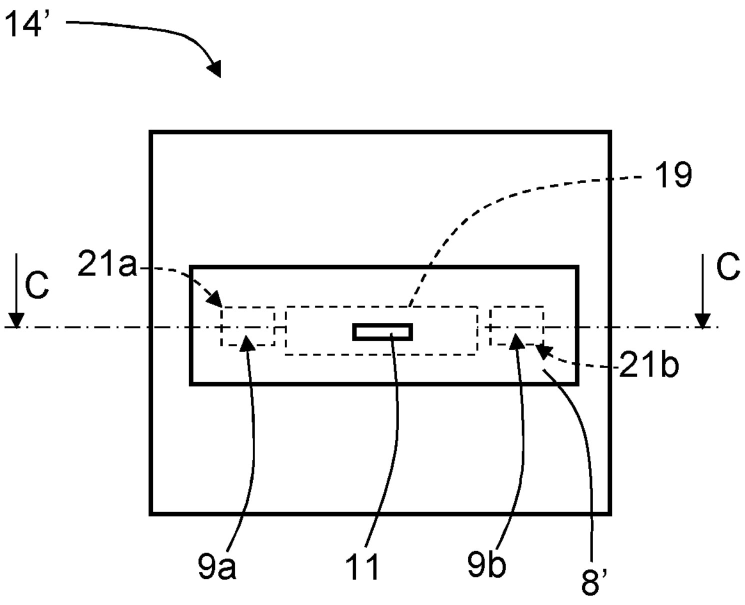
FIG. 10 corresponds to FIG. 9 with a waveguide adapter, comprising a diplexer arrangement, mounted.
Figure 11:
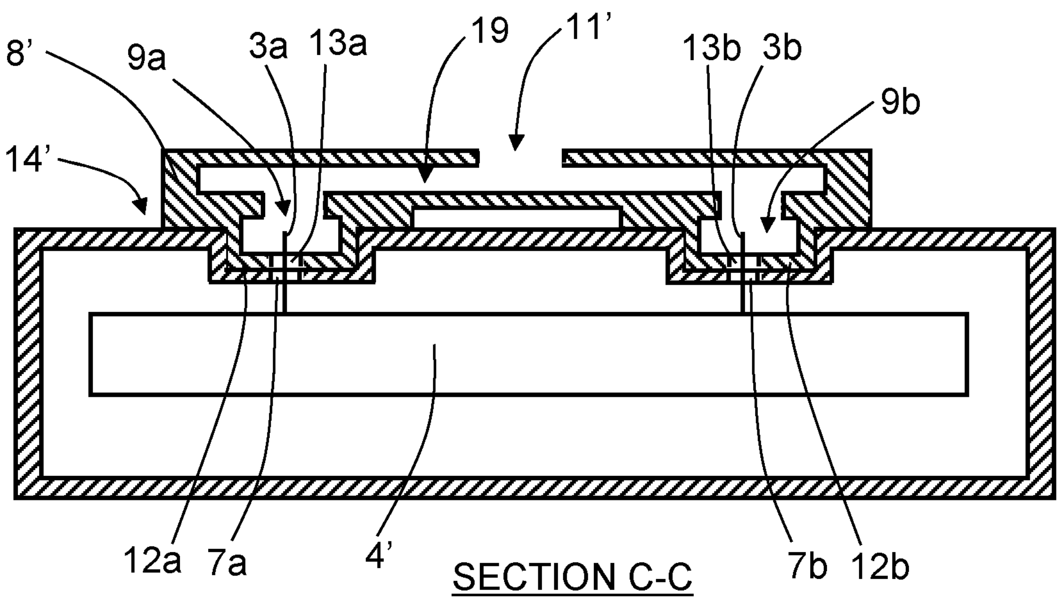
FIG. 11 shows a schematic section side view of FIG. 10 showing the radio unit according to the second example with a waveguide adapter, comprising a diplexer arrangement, mounted.

With reference to also to FIG. 10 that shows a waveguide adapter 8' according to the second example mounted to the radio ports **20*a*, 20*b* and FIG. 11 that shows a section of FIG. 10, the waveguide adapter 8' comprises a first adapter port 21*a* and a second adapter port 21*b*. The first adapter port 21*a* comprises a first adapter cavity 9*a* and a first outer insulating part 13*a*, and the second adapter port 21*b* comprises a second adapter cavity 9*b* and a second outer insulating part 13*b*, where the adapter cavities 9*a*, 9*b* are connected via a diplexer arrangement 19 comprised in the waveguide adapter 8'. The first adapter cavity 9*a* is adapted to be mounted to the first radio cavity 2*a* and the second adapter cavity 9***b* is adapted to be mounted to the second radio cavity 2*b*. In this way, a diplexer arrangement 19 is integrated in the waveguide adapter 8' and is adapted to be connected to corresponding ports 20*a*, 20*b* in the microwave radio transceiver 14.

The diplexer arrangement comprises a waveguide interface 11' corresponding to the one described previously, and the probes 3*a*, 3*b* are connected to a radio part 4'.

This means that one and the same microwave radio transceiver 14' can be used to be connected to different diplexer arrangements 19, where the microwave radio transceiver 14' comprises a transmitting radio port 20*a* and a receiving radio port 20*b*. There can be a number of diplexer arrangements 19 that together provide functionality for the frequency bands the radio part 4 is capable of handling. Therefore, one standard microwave radio transceiver 14 can be made for all frequency bands the radio part 4 is capable of handling, having identical radio cavities 2*a*, 2*b*.

According to some aspects, at least one radio cavity 2; 2*a*, 2*b* and at least one corresponding adapter cavity 9; 9*a*, 9*b* has a square shape. This enables an adapter cavity 9; 9*a*, 9*b* to be mounted to a radio cavity 2; 2*a*, 2*b* in different steps of 90°, allowing for adaptation to orthogonal polarizations.

By means of the present disclosure, in order to compensate for the inherent limitation in bandwidth of waveguides, an adaptive coaxial interface is disclosed. A waveguide transition is formed with a coaxial probe having a protrusion distance D that is used to set transition performance, where a smaller protrusion distance D corresponds to a higher frequency.

By means of the present disclosure, wide band microwave radio transceivers that can support more than one waveguide band are enabled, which confers a big advantage in production. The customers will benefit from universal spare parts, as one spare part could replace any frequency in their network. For microwave radio transceivers with diplexers, logistics will be alleviated as the customer can change to their preferred index/version in field.

Figure 12:
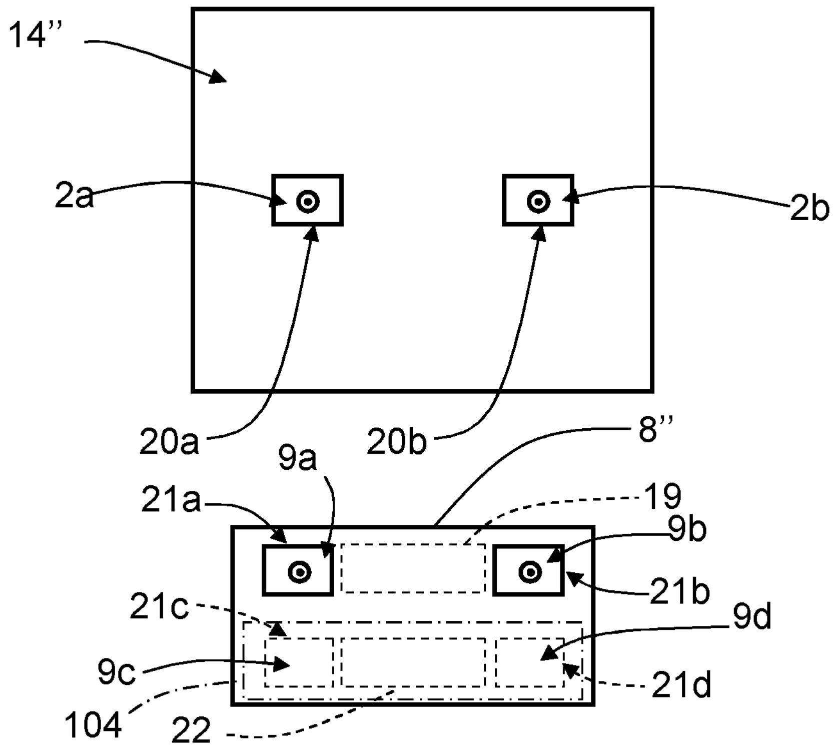
FIG. 12 schematically shows a first example of a microwave radio transceiver arrangement with a microwave radio transceiver test arrangement.

The present disclosure can of course be applied to many different situations and applications. As shown in FIG. 12, the waveguide adapter 8'' comprises a third adapter port 21*c* and a fourth adapter port 21*d*, where the third comprises a third adapter cavity 9*c* and the fourth adapter port 21*d* comprises a fourth adapter cavity 9*d*, where the adapter cavities 9*c*, 9*d* are connected via a power loop waveguide section 22. In this manner, the transmitting radio port 20*a* and the receiving radio port 20*b* can be connected and radio functionality be tested when the third adapter port 21*c* and the fourth adapter port 21*d* are connected to the corresponding radio ports 20*a*, 20*b* in the microwave radio transceiver 14'.

As shown in FIG. 12, this waveguide adapter 8'' also comprises the previously described diplexer arrangement 19, and depending on how the waveguide adapter 8'' is turned either the diplexer arrangement 19 or the power loop waveguide section 22 is connected to the transmitting radio port 20*a* and the receiving radio port 20*b* since, on the one hand, the first adapter port 21*a* and the second adapter port 21*b*, and on the other hand, the third adapter port 21*c* and the fourth adapter port 21*d* are positioned on opposite sides. A separate waveguide adapter only comprising the third adapter port 21*c*, the fourth adapter port 21*d* and the power loop waveguide section 22 is of course also conceivable.

Figure 13:
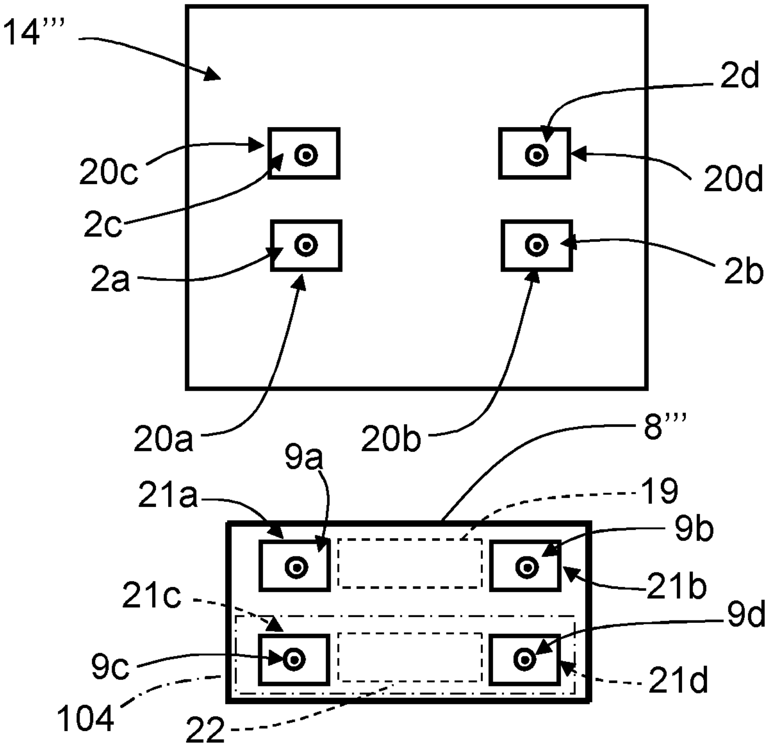
FIG. 13 schematically shows a second example of a microwave radio transceiver arrangement with a microwave radio transceiver test arrangement.

Yet another alternative is disclose in FIG. 13, where the microwave radio transceiver 14''' comprises a separate transmitting test radio port 20*c* adapted to transmit a generated signal, and a separate receiving test radio port 20*d* adapted to receive and detect a signal that is transferred from the transmitting test radio port 20*c*. Here, there is a waveguide adapter 8''' that comprises the previously described diplexer arrangement 19 and power loop waveguide section 22, and since the first adapter port 21*a*, the second adapter port 21*b*, the third adapter port 21*c* and the fourth adapter port 21*d* are positioned on the same side, these ports can be connected to the radio ports 20*a*, 20*b*, 20*c*, 20*d* of the microwave radio transceiver 14''' simultaneously, such that the microwave radio transceiver 14''' can be operated and tested at the same time.

Figure 16:
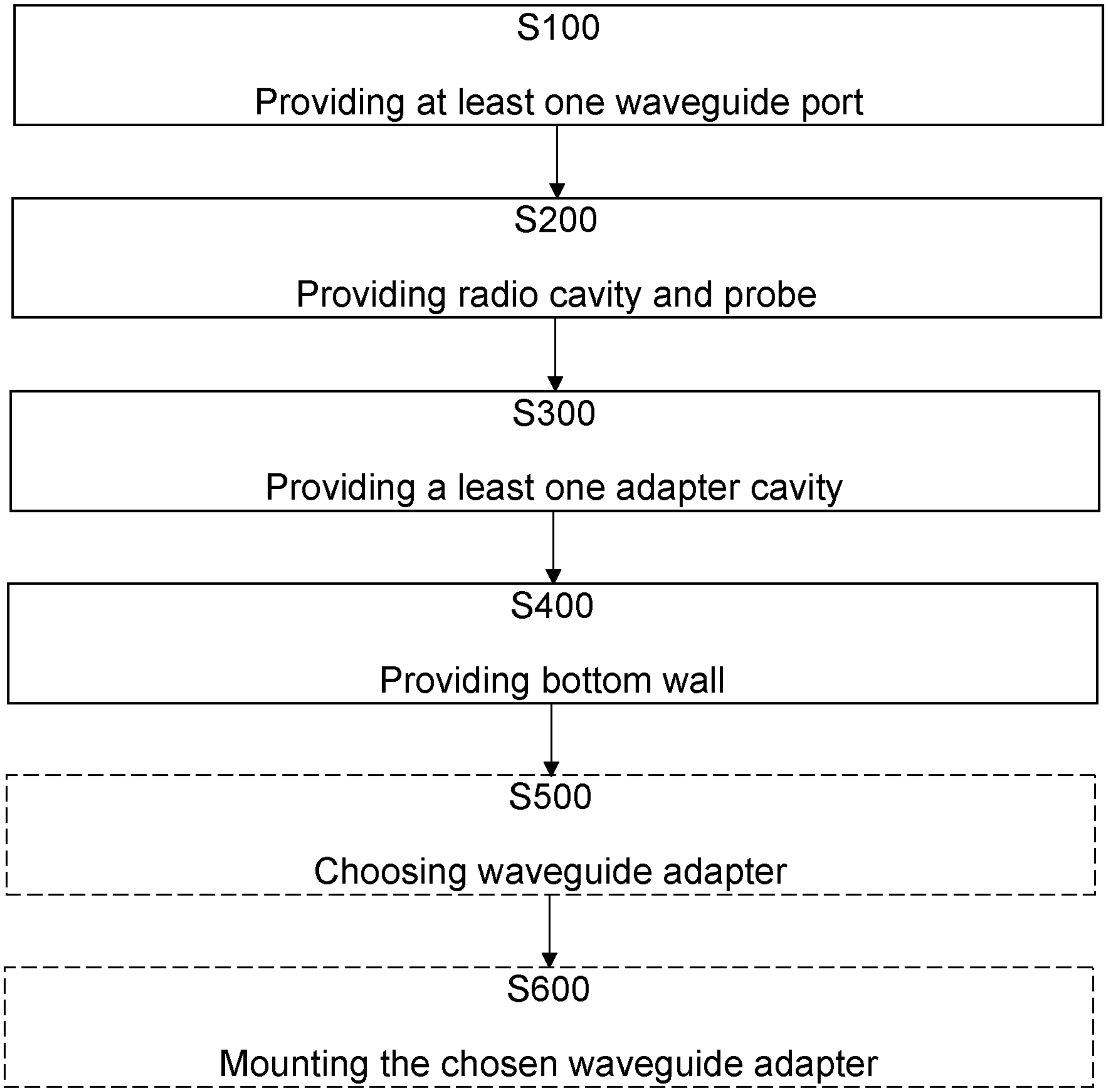
FIG. 16 shows a flowchart for methods according to the present disclosure.

With reference to FIG. 16, the present disclosure relates to a method for configuring a microwave radio transceiver system 1; 1*a*, 1*b* comprising at least two waveguide adapters $\mathbf{8}_1$, $\mathbf{8}_2$; 8' and a microwave radio transceiver 14 adapted for at least two waveguide frequency bands. For the microwave radio transceiver 14, the method comprises providing S100 at least one radio port 20; 20*a*, 20*b*, and for each radio port 20; 20*a*, 20*b*, the method comprises providing S200 a corresponding probe 3; 3*a*, 3*b* of a fixed length that is connected to a radio part 4, 4' and extends via an inner insulating part 7; 7*a*, 7*b* in a bottom 5 comprised in the corresponding radio port 20; 20*a*, 20*b*. For each waveguide adapter 8, 8', the method comprises providing S300 at least one corresponding adapter cavity 9; 9*a*, 9*b* that is adapted to be inserted into a corresponding radio cavity 2, 2*a*, 2*b*, each waveguide adapter $\mathbf{8}_1$, $\mathbf{8}_2$, 8' comprising a first end 15 that is adapted to face the corresponding bottom 5. For each adapter cavity 9; 9*a*, 9*b* in a waveguide adapter $\mathbf{8}_1$, $\mathbf{8}_2$, 8', the method comprises providing S400 a bottom wall $\mathbf{12}_1$, $\mathbf{12}_2$ with an outer insulating part 13 at the first end 15, through which outer insulating part 13 the corresponding probe 3 is adapted to protrude a protrusion distance D within the adapter cavity 9; 9*a*, 9*b* when mounted. The protrusion distance D is dependent on a thickness $T_1$, $T_2$ of the bottom wall $\mathbf{12}_1$, $\mathbf{12}_2$, where at least two waveguide adapters $\mathbf{8}_1$, $\mathbf{8}_2$, 8' have different thickness $T_1$, $T_2$ of the corresponding bottom wall $\mathbf{12}_1$, $\mathbf{12}_2$, where any one of the waveguide adapters $\mathbf{8}_1$, $\mathbf{8}_2$, 8' is exchangeably mountable to said radio port 20; 20*a*, 20*b*.

According to some aspects, the method comprises choosing S500 a waveguide adapter $\mathbf{8}_1$, $\mathbf{8}_2$ among the available waveguide adapters $\mathbf{8}_1$, $\mathbf{8}_2$, where the chosen waveguide adapter $\mathbf{8}_1$, $\mathbf{8}_2$ is adapted for a chosen waveguide frequency band; and mounting S600 the chosen waveguide adapter $\mathbf{8}_1$, $\mathbf{8}_2$ to a corresponding radio port 20; 20*a*, 20*b*.

The present disclosure is not limited to the above, but may vary freely within the scope of the dependent claims. For example, a radio cavity and a corresponding adapter cavity can have any suitable shape such as circular, oval, octagonal etc.

Figure 14:
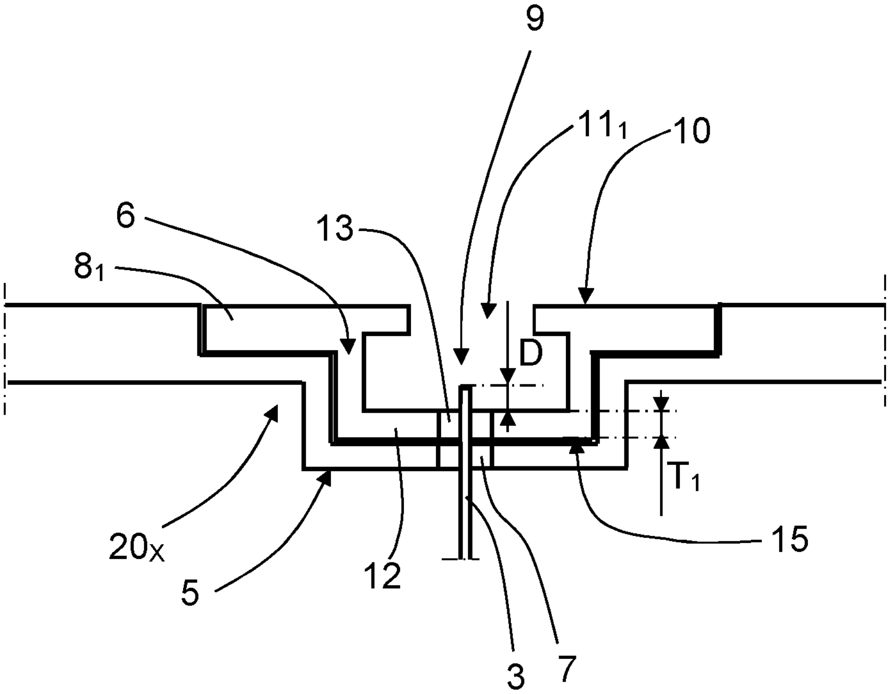
FIG. 14 shows an enlarged cut-open view of a part of FIG. 6 according to an alternate embodiment.

According to some aspects, with reference to FIG. 14 that corresponds to FIG. 7 and shows an alternative radio port $\mathbf{20}_X$, each waveguide adapter $\mathbf{8}_1$ can be mounted in a countersink at the microwave radio transceiver 14 such that the waveguide adapter $\mathbf{8}_1$ becomes more or less flush with the outer surface of the microwave radio transceiver 14 at the place of mounting.

Figure 15:
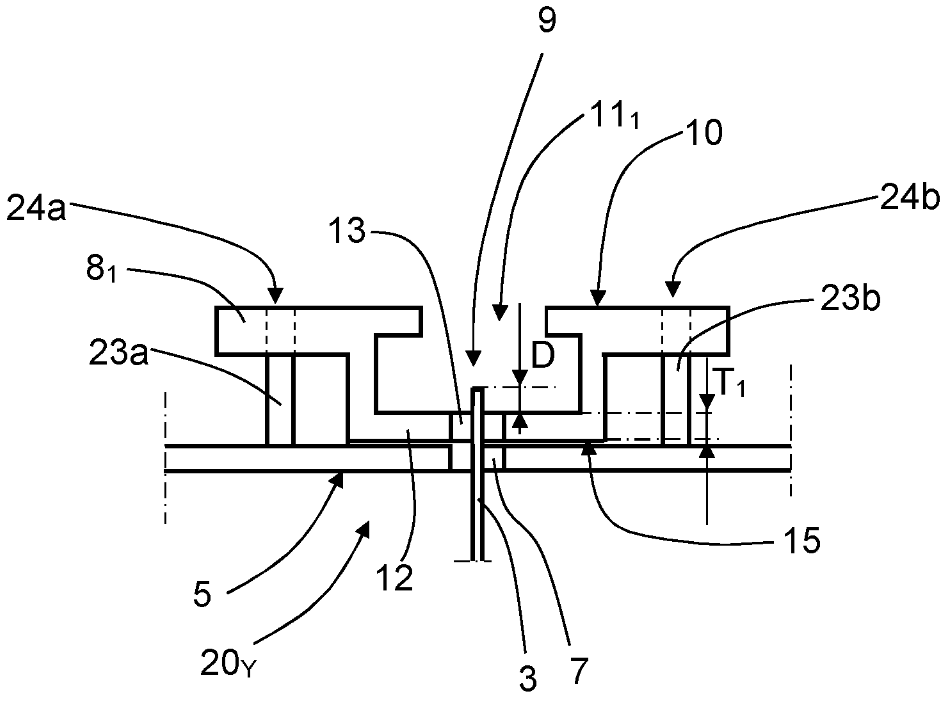
FIG. 15 shows an enlarged cut-open view of a part of FIG. 6 according to an alternate embodiment.

According to some aspects, with reference to FIG. 15 that corresponds to FIG. 7 and shows an alternative radio port $\mathbf{20}_Y$, there need not be any radio cavity comprised in the radio port. The radio port $\mathbf{20}_Y$ can instead comprise a bottom 5 that is more or less flush with the outer surface of the microwave radio transceiver 14 as indicated in FIG. 15, or even protrude from the outer surface of the microwave radio transceiver 14. Different shapes are also possible such as concave-convex and similar. According to some further aspects, in particular for this case, there can be guiding pins 23*a*, 23*b* and corresponding guiding apertures 24*b*, 24*b* (only two shown in FIG. 15 for reasons of clarity, but there can of course be more guiding pins and guiding apertures provided at each waveguide adapter $\mathbf{8}_1$ and the radio port $\mathbf{20}_Y$ in a well-known manner and similar that ensure that the waveguide adapter $\mathbf{8}_1$ is mounted correctly.

In this context, a port is any type of RF interface part that is connectable to a corresponding RF interface part.

Generally, the present disclosure relates to a adaptable microwave radio transceiver system 1 comprising a microwave radio transceiver 14 and at least two waveguide adapters $\mathbf{8}_1$, $\mathbf{8}_2$; 8', where the microwave radio transceiver 14 is adapted for at least two waveguide frequency bands and comprises at least one radio port 20; 20*a*, 20*b*, where each radio port 20; 20*a*, 20*b* comprises a corresponding probe 3; 3*a*, 3*b* of a fixed length that is connected to a radio part 4, 4', and extends via an inner insulating part 7; 7*a*, 7*b* in a bottom 5 comprised in the corresponding radio port 20; 20*a*, 20*b*, wherein each waveguide adapter 8, 8' comprises a first end 15 that is adapted to face the corresponding bottom 5 where each first end 15 comprises a bottom wall $\mathbf{12}_1$, $\mathbf{12}_2$ with an outer insulating part 13, through which outer insulating part 13 the corresponding probe 3 is adapted to protrude a protrusion distance D when mounted, where the protrusion distance D is dependent on a thickness $T_1$, $T_2$ of the bottom wall $\mathbf{12}_1$, $\mathbf{12}_2$, where at least two waveguide adapters $\mathbf{8}_1$, $\mathbf{8}_2$, 8' have different thickness $T_1$, $T_2$ of the corresponding bottom wall $\mathbf{12}_1$, $\mathbf{12}_2$, where any one of the waveguide adapters $\mathbf{8}_1$, $\mathbf{8}_2$, 8' is exchangeably mountable to said radio port 20; 20*a*, 20*b*.

According to some aspects, each radio port 20; 20*a*, 20*b* comprises a corresponding radio cavity 2, 2*a*, 2*b* that in turn comprises the probe 3; 3*a*, 3*b* and has said bottom 5 and a top 6, where, for each radio cavity 2, 2*a*, 2*b*, the probe 3; 3*a*, 3*b* extends within the radio cavity 2; 2*a*, 2*b* via the inner insulating part 7; 7*a*, 7*b* in the bottom 5 towards the top 6, where each radio cavity 2; 2*a*, 2*b* is adapted to receive a corresponding waveguide adapter $\mathbf{8}_1$, $\mathbf{8}_2$, 8' that comprises an adapter cavity 9; 9*a*, 9*b* that is adapted to be inserted into the radio cavity 2, 2*a*, 2*b*, where the corresponding probe 3 is adapted to protrude a protrusion distance D within the corresponding adapter cavity 9; 9*a*, 9*b* when mounted.

According to some aspects, at least one radio cavity 2; 2*a*, 2*b* and at least one corresponding adapter cavity 9; 9*a*, 9*b* has a square shape.

According to some aspects, each waveguide adapter 8' comprises a first adapter port 21*a* and a second adapter port 21*b*, where the first adapter port 21*a* comprises a first adapter cavity 9*a* and the second adapter port 21*b* comprises a second adapter cavity 9*b*, where the adapter cavities 9*a*, 9*b* are connected via a diplexer arrangement 19 comprised in the waveguide adapter 8'.

According to some aspects, each waveguide adapter $\mathbf{8}_1$, $\mathbf{8}_2$, 8' comprises a second end 10 that comprises a waveguide interface $\mathbf{11}_1$, $\mathbf{11}_2$ and is adapted to face a waveguide part 17.

According to some aspects, the waveguide interface $\mathbf{11}_1$, $\mathbf{11}_2$ is adapted to be mounted to a waveguide part 17 that comprises an antenna feeder 17 that is comprised in an antenna arrangement 18.

Generally, the present disclosure relates to a microwave radio transceiver 14 comprising at least one radio port 20; 20*a*, 20*b*, each radio port 20; 20*a*, 20*b* comprising a corresponding probe 3; 3*a*, 3*b* of a fixed length that is connected to a radio part 4, 4', and extends via an inner insulating part 7; 7*a*, 7*b* in a bottom 5 comprised in the corresponding radio port 20; 20*a*, 20*b*, where each radio port 20; 20*a*, 20*b* is adapted to receive a corresponding waveguide adapter $\mathbf{8}_1$, $\mathbf{8}_2$, 8' comprising a first end 15 that is adapted to face the corresponding bottom 5 and comprises a bottom wall $\mathbf{12}_1$, $\mathbf{12}_2$; 12*a*, 12*b* with an outer insulating part 13, through which outer insulating part 13 the corresponding probe 3 is adapted to protrude a protrusion distance D when mounted, where the protrusion distance D is dependent on a thickness $T_1$, $T_2$ of the bottom wall $\mathbf{12}_1$, $\mathbf{12}_2$; 12*a*, 12*b*.

According to some aspects, each radio port 20; 20*a*, 20*b* comprises a corresponding radio cavity 2, 2*a*, 2*b* that in turn comprises the probe 3; 3*a*, 3*b* and has said bottom 5 and a top 6, where, for each radio cavity 2, 2*a*, 2*b*, the probe 3; 3*a*, 3*b* extends within the radio cavity 2; 2*a*, 2*b* via the inner insulating part 7; 7*a*, 7*b* in the bottom 5 towards the top 6, where each radio cavity 2; 2*a*, 2*b* is adapted to receive a corresponding waveguide adapter $\mathbf{8}_1$, $\mathbf{8}_2$, 8' that comprises an adapter cavity 9; 9*a*, 9*b* that is adapted to be inserted into the radio cavity 2, 2*a*, 2*b*, where the corresponding probe 3 is adapted to protrude a protrusion distance D within the corresponding adapter cavity 9; 9*a*, 9*b* when mounted.

According to some aspects, the microwave radio transceiver 14' comprises a transmitting radio port 20*a* adapted to transmit a generated signal, and a receiving radio port 20*b* adapted to receive a received signal.

According to some aspects, the microwave radio transceiver 14", 14'" comprises a transmitting test radio port 20*c* adapted to transmit a generated signal, and a receiving waveguide test port 20*d* adapted to receive and detect a signal that is transferred from the transmitting test radio port 20*c*. Generally, the present disclosure relates to a microwave waveguide adapter $\mathbf{8}_1$, $\mathbf{8}_2$, 8' a first end 15 that in turn comprises a bottom wall $\mathbf{12}_1$, $\mathbf{12}_2$; 12*a*, 12*b* with an outer insulating part 13, where each bottom wall $\mathbf{12}_1$, $\mathbf{12}_2$; 12*a*, 12*b* is adapted to be mounted towards a corresponding radio port 20*a*, 20*b* that in turn comprises a corresponding probe 3; 3*a*, 3*b* of a fixed length that is connected to a radio part 4, 4' in a microwave radio transceiver 14, where, for each radio port 20*a*, 20*b*, the probe 3; 3*a*, 3*b* extends via an inner insulating part 7; 7*a*, 7*b* in a bottom 5 comprised in the corresponding radio port 20; 20*a*, 20*b* and is adapted to protrude a protrusion distance D via the outer insulating part 13 when mounted, where the protrusion distance D is dependent on the thickness $T_1$, $T_2$ of the bottom wall $\mathbf{12}_1$, $\mathbf{12}_2$; 12*a*, 12*b*.

According to some aspects, the waveguide adapter $\mathbf{8}_1$, $\mathbf{8}_2$, 8' comprises a corresponding adapter cavity 9; 9*a*, 9*b* that is adapted to be inserted into a corresponding radio cavity 2, 2*a*, 2*b* comprised in a corresponding radio port 20*a*, 20*b*, where the corresponding probe 3 is adapted extend within the radio cavity 2; 2*a*, 2*b* via the inner insulating part 7; 7*a*, 7*b* in the bottom 5 towards a top 6, and to protrude a protrusion distance D within the corresponding adapter cavity 9; 9*a*, 9*b* when mounted According to some aspects, the waveguide adapter $\mathbf{8}_1$, $\mathbf{8}_2$, 8' comprises a second end 10 that comprises a waveguide interface $\mathbf{11}_1$, $\mathbf{11}_2$ and is adapted to face a waveguide part 17.

According to some aspects, the waveguide interface $\mathbf{11}_1$, $\mathbf{11}_2$ is adapted to be mounted to a waveguide part 17 that comprises an antenna feeder 17 that is comprised in an antenna arrangement 18.

According to some aspects, the waveguide adapter 8' comprises a first adapter port 21*a* and a second adapter port 21*b*, where the first adapter port 21*a* and the second adapter port 21*b* are connected via a diplexer arrangement 19 comprised in the waveguide adapter 8'.

According to some aspects, the waveguide adapter 8", 8'" comprises a third adapter port 21*c* and a fourth adapter port

21*d*, where the third adapter port 21*c* and the fourth adapter port 21*d* are connected via a power loop waveguide section 22.

According to some aspects, the present disclosure relates to an adaptable microwave radio transceiver system 1 comprising a microwave radio transceiver 14 and at least two waveguide adapters $8_1$, $8_2$; 8', where the microwave radio transceiver 14 is adapted for at least two waveguide frequency bands and comprises at least one radio port 20; 20*a*, 20*b*, where each radio port 20; 20*a*, 20*b* comprises a radio cavity 2, 2*a*, 2*b*, and a corresponding probe 3; 3*a*, 3*b* of a fixed length that is connected to a radio part 4, 4', where each radio cavity 2; 2*a*, 2*b* has a bottom 5 and a top 6, where, for each radio cavity 2; 2*a*, 2*b*, the probe 3; 3*a*, 3*b* extends within the radio cavity 2; 2*a*, 2*b*, via an inner insulating part 7; 7*a*, 7*b* in the bottom 5 towards the top 6, wherein each waveguide adapter 8, 8' comprises at least one corresponding adapter cavity 9; 9*a*, 9*b* that is adapted to be inserted into a corresponding radio cavity 2, 2*a*, 2*b*, each waveguide adapter $8_1$, $8_2$, 8' comprising a first end 15 that is adapted to face the corresponding bottom 5 where, for each adapter cavity 9; 9*a*, 9*b* in a waveguide adapter $8_1$, $8_2$, 8', the first end 15 comprises a bottom wall $12_1$, $12_2$ with an outer insulating part 13, through which outer insulating part 13 the corresponding probe 3 is adapted to protrude a protrusion distance D within the adapter cavity 9; 9*a*, 9*b* when mounted, where the protrusion distance D is dependent on a thickness $T_1$, $T_2$ of the bottom wall $12_1$, $12_2$, where at least two waveguide adapters $8_1$, $8_2$, 8' have different thickness $T_1$, $T_2$ of the corresponding bottom wall $12_1$, $12_2$, where any one of the waveguide adapters $8_1$, $8_2$, 8' is exchangeably mountable to said radio port 20; 20*a*, 20*b*.

According to some aspects, the present disclosure relates to a microwave radio transceiver 14 comprising at least one radio port 20; 20*a*, 20*b*, each radio port 20; 20*a*, 20*b* comprising a corresponding radio cavity 2, 2*a*, 2*b* that in turn comprises a probe 3; 3*a*, 3*b* of a fixed length that is connected to a radio part 4, 4', and has a bottom 5 and a top 6, where, for each radio cavity 2, 2*a*, 2*b*, the probe 3; 3*a*, 3*b* extends within the radio cavity 2; 2*a*, 2*b* via an inner insulating part 7; 7*a*, 7*b* in the bottom 5 towards the top 6, where each radio cavity 2; 2*a*, 2*b* is adapted to receive a corresponding waveguide adapter $8_1$, $8_2$, 8' that comprises an adapter cavity 9; 9*a*, 9*b* that is adapted to be inserted into the radio cavity 2, 2*a*, 2*b*, each waveguide adapter $8_1$, $8_2$, 8' comprising a first end 15 that is adapted to face the bottom 5 and comprises a bottom wall $12_1$, $12_2$; 12*a*, 12*b* with an outer insulating part 13, through which outer insulating part 13 the corresponding probe 3 is adapted to protrude a protrusion distance D within the adapter cavity 9; 9*a*, 9*b* when mounted, where the protrusion distance D is dependent on a thickness $T_1$, $T_2$ of the bottom wall $12_1$, $12_2$; 12*a*, 12*b*.

According to some aspects, the present disclosure relates to a microwave waveguide adapter $8_1$, $8_2$, 8' comprising at least one adapter cavity 9; 9*a*, 9*b*, a first end 15 and a second end 10, where, for each adapter cavity 9; 9*a*, 9*b*, the first end 15 comprises a bottom wall $12_1$, $12_2$; 12*a*, 12*b* with an outer insulating part 13, where each adapter cavity 9; 9*a*, 9*b* is adapted to be inserted into a corresponding radio cavity 2, 2*a*, 2*b* that in turn comprises a probe 3; 3*a*, 3*b* of a fixed length that is connected to a radio part 4, 4' in a microwave radio transceiver 14, where each radio cavity 2, 2*a*, 2*b* has a bottom 5 and a top 6, where, for each radio cavity 2, 2*a*, 2*b*, the probe 3; 3*a*, 3*b* extends within the radio cavity 2; 2*a*, 2*b* via an inner insulating part 7; 7*a*, 7*b* in the bottom 5 towards the top 6 and is adapted to protrude a protrusion distance D within the corresponding adapter cavity 9; 9*a*, 9*b* via the outer insulating part 13 when mounted, where the protrusion distance D is dependent on the thickness $T_1$, $T_2$ of the bottom wall $12_1$, $12_2$; 12*a*, 12*b*.

According to some aspects, the waveguide adapter 8' comprises a first adapter port 21*a* and a second adapter port 21*b*, where the first adapter port 21*a* comprises a first adapter cavity 9*a* and the second adapter port 21*b* comprises a second adapter cavity 9*b*, where the adapter cavities 9*a*, 9*b* are connected via a diplexer arrangement 19 comprised in the waveguide adapter 8'.

According to some aspects, the waveguide adapter 8'', 8''' comprises a third adapter port 21*c* and a fourth adapter port 21*d*, where the third adapter port 21*c* comprises a third adapter cavity 9*c* and the fourth adapter port 21*d* comprises a fourth adapter cavity 9*d*, where the adapter cavities 9*c*, 9*d* are connected via a power loop waveguide section 22.

The invention claimed is:

1. An adaptable microwave radio transceiver system comprising:

a microwave radio transceiver; and at least two waveguide adapter;

the microwave radio transceiver is configured for at least two waveguide frequency bands and comprises at least one radio port, each radio port comprises a corresponding probe of a fixed length that is connected to a radio part, the probe extending via an inner insulating part in a bottom of the radio port; and each waveguide adapter comprises a first end that is configured to face the bottom of the radio port where each first end comprises a bottom wall with an outer insulating part, through which outer insulating part the corresponding probe is configured to protrude a protrusion distance when mounted, the protrusion distance is dependent on a thickness of the bottom wall, at least two waveguide adapters have different thickness of the corresponding bottom wall, and any one of the waveguide adapters is exchangeably mountable to the radio port.

2. The microwave radio transceiver system according to claim 1, wherein each radio port comprises a corresponding radio cavity that in turn comprises the probe and has said bottom and a top, where, for each radio cavity, the probe extends within the radio via the inner insulating part in the bottom towards the top, where each radio cavity is configured to receive a corresponding waveguide adapter that comprises an adapter cavity that is configured to be inserted into the radio cavity, where the corresponding probe is configured to protrude a protrusion distance within the corresponding adapter cavity when mounted.

3. The microwave radio transceiver system according to claim 2, wherein at least one radio cavity and at least one corresponding adapter cavity has a square shape.

4. The microwave radio transceiver system according to claim 2, wherein each waveguide adapter comprises a first adapter port and a second adapter port, where the first adapter port comprises a first adapter cavity and the second adapter port comprises a second adapter cavity, where the adapter cavities are connected via a diplexer arrangement comprised in the waveguide adapter.

5. The microwave radio transceiver system according to claim 2, wherein each waveguide adapter comprises a second end that comprises a waveguide interface and is configured to face a waveguide part.

6. The microwave radio transceiver system according to claim 2, wherein the waveguide interface is configured to be mounted to a waveguide part that comprises an antenna feeder that is comprised in an antenna arrangement.

7. The microwave radio transceiver system according to claim 1, wherein each waveguide adapter comprises a second end that comprises a waveguide interface and is configured to face a waveguide part.

8. The microwave radio transceiver system according to claim 1, wherein the waveguide interface is configured to be mounted to a waveguide part that comprises an antenna feeder that is comprised in an antenna arrangement.

9. A microwave radio transceiver comprising:

at least one radio port, each radio port comprising a corresponding probe of a fixed length that is connected to a radio part, the probe extending via an inner insulating part in a bottom of the radio port, each radio port is configured to receive a corresponding waveguide adapter comprising a first end that is configured to face the bottom of the radio port and comprises a bottom wall with an outer insulating part, through which outer insulating part the corresponding probe is configured to protrude a protrusion distance when mounted, the protrusion distance is dependent on a thickness of the bottom wall.

10. The microwave radio transceiver according to claim 7, wherein each radio port comprises a corresponding radio cavity that in turn comprises the probe and has said bottom and a top for each radio cavity, the probe extends within the radio cavity via the inner insulating part in the bottom towards the top, where each radio cavity is configured to receive a corresponding waveguide adapter that comprises an adapter cavity that is configured to be inserted into the radio cavity, where the corresponding probe is configured to protrude a protrusion distance within the corresponding adapter cavity when mounted.

11. The microwave radio transceiver according to claim 7, wherein the microwave radio transceiver comprises a transmitting radio port configured to transmit a generated signal, and a receiving radio port configured to receive a received signal.

12. The microwave radio transceiver according to claim 7, wherein the microwave radio transceiver comprises a transmitting test radio port configured to transmit a generated signal, and a receiving waveguide test port configured to receive and detect a signal that is transferred from the transmitting test radio port.

13. A microwave waveguide adapter having a first end that in turn comprises a bottom wall with an outer insulating part, each bottom wall is configured to be mounted towards a corresponding radio port that in turn comprises a corresponding probe of a fixed length that is connected to a radio part in a microwave radio transceiver where, for each radio port, the probe extends via an inner insulating part in a bottom of the radio port and is configured to protrude a protrusion distance via the outer insulating part when mounted, where the protrusion distance (D) is dependent on the thickness of the bottom wall.

14. The waveguide adapter according to claim 13, wherein the waveguide adapter comprises a corresponding adapter cavity that is configured to be inserted into a corresponding radio cavity comprised in a corresponding radio port, where the corresponding probe is configured extend within the radio cavity via the inner insulating part in the bottom towards a top, and to protrude a protrusion distance within the corresponding adapter cavity when mounted.

15. The waveguide adapter according to claim 13, wherein the waveguide adapter comprises a second end that comprises a waveguide interface and is configured to face a waveguide part.

16. The waveguide adapter according to claim 13, wherein the waveguide interface is configured to be mounted to a waveguide part that comprises an antenna feeder that is comprised in an antenna arrangement.

17. The waveguide adapter according to claim 13, wherein the waveguide adapter comprises a first adapter port and a second adapter port, where the first adapter port and the second adapter port are connected via a diplexer arrangement comprised in the waveguide adapter.

18. The waveguide adapter according to claim 13, wherein the waveguide adapter comprises a third adapter port and a fourth adapter port, where the third adapter port and the fourth adapter port are connected via a power loop waveguide section.

19. A method for configuring a microwave radio transceiver system comprising at least two waveguide adapters and a microwave radio transceiver configured for at least two waveguide frequency bands, the method for the microwave radio transceiver comprising:

providing at least one radio port, for each radio port, the method comprising:

providing a corresponding probe of a fixed length that is connected to a radio part, the probe extending via an inner insulating part in a bottom in of the radio port, for each waveguide adapter, the method comprising:

providing at least one corresponding adapter cavity that is configured to be inserted into a corresponding radio cavity, each waveguide adapter comprising a first end that is configured to face the bottom of the radio port where, for each adapter cavity in a waveguide adapter, the method comprising:

providing a bottom wall with an outer insulating part at the first end, through which outer insulating part the corresponding probe is configured to protrude a protrusion distance within the adapter cavity when mounted, the protrusion distance is dependent on a thickness of the bottom wall, where at least two waveguide adapters have different thickness of the corresponding bottom wall, any one of the waveguide adapters is exchangeably mountable to the radio port.

20. The method according to claim 19, wherein the method comprises:

choosing a waveguide adapter among the available waveguide adapters, where the chosen waveguide adapter is configured for a chosen waveguide frequency band; and mounting the chosen waveguide adapter to a corresponding radio port.

* * * * *